(12) United States Patent
Cousineau

(10) Patent No.: US 9,046,197 B2
(45) Date of Patent: Jun. 2, 2015

(54) PARA-SEISMIC SUPPORT FOR PIPES

(75) Inventor: Martin Cousineau, Repentigny (CA)

(73) Assignee: INDUSTRIES SISMIQUE INC., Repentigny, Québec (CA)

( * ) Notice: Subject to any disclaimer, the term of this patent is extended or adjusted under 35 U.S.C. 154(b) by 0 days.

(21) Appl. No.: 13/992,621

(22) PCT Filed: Dec. 9, 2011

(86) PCT No.: PCT/CA2011/001357
§ 371 (c)(1),
(2), (4) Date: Aug. 15, 2013

(87) PCT Pub. No.: WO2012/075576
PCT Pub. Date: Jun. 14, 2012

(65) Prior Publication Data
US 2014/0008500 A1    Jan. 9, 2014

Related U.S. Application Data

(60) Provisional application No. 61/457,019, filed on Dec. 9, 2010.

(51) Int. Cl.
*F16L 3/00* (2006.01)
*F16L 3/133* (2006.01)
*F16L 3/10* (2006.01)
*F16L 3/11* (2006.01)

(52) U.S. Cl.
CPC ............... *F16L 3/133* (2013.01); *F16L 3/1016* (2013.01); *F16L 3/11* (2013.01)

(58) Field of Classification Search
CPC ............ F16L 3/1016; F16L 3/133; F16L 3/11
USPC .................................. 248/62, 58, 74.1, 74.4
See application file for complete search history.

(56) References Cited

U.S. PATENT DOCUMENTS

| | | | | |
|---|---|---|---|---|
| 2,918,239 | A * | 12/1959 | Wirth | 248/55 |
| 2,942,820 | A * | 6/1960 | Sherburne | 248/62 |
| 3,528,634 | A * | 9/1970 | Jenkins | 248/70 |
| 7,090,173 | B2 * | 8/2006 | Lussier | 248/58 |

* cited by examiner

*Primary Examiner* — Anita M King
(74) *Attorney, Agent, or Firm* — Equinox IP; Franz Bonsang

(57) ABSTRACT

A para-seismic support for a pipe comprising a support member configured to receive the pipe, the support member having means of supporting the para-seismic support from a ceiling structure and at least one axial side plate extending in a generally vertical plane perpendicular to the axis of the pipe when resting on the support member, the side plate having a pair of attachment holes extending therethrough configured for attaching to a support element.

11 Claims, 4 Drawing Sheets

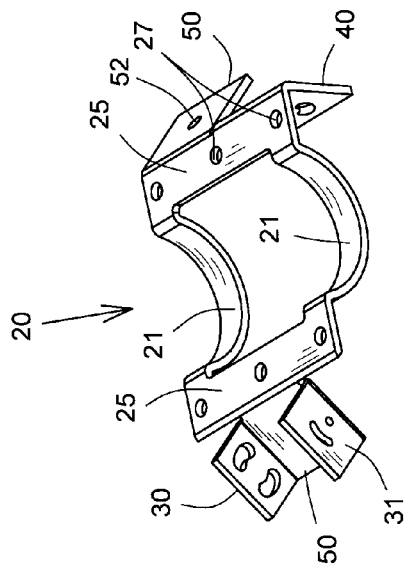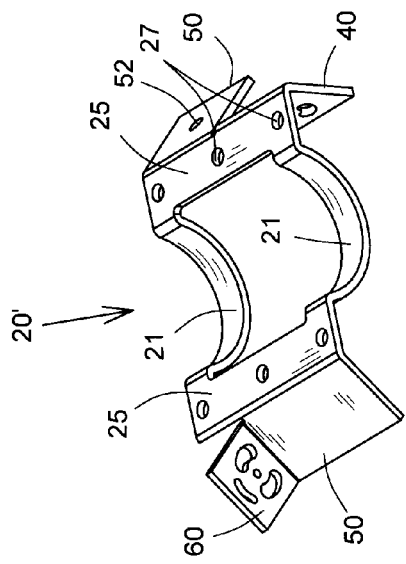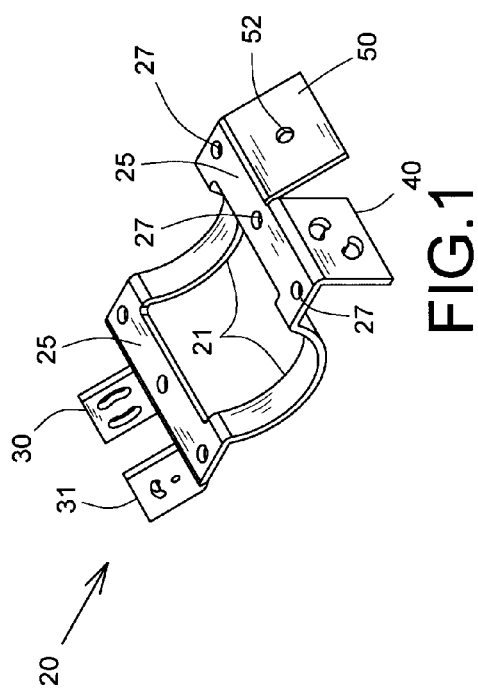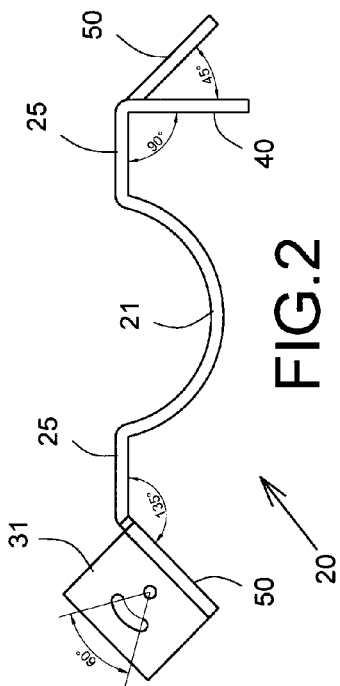

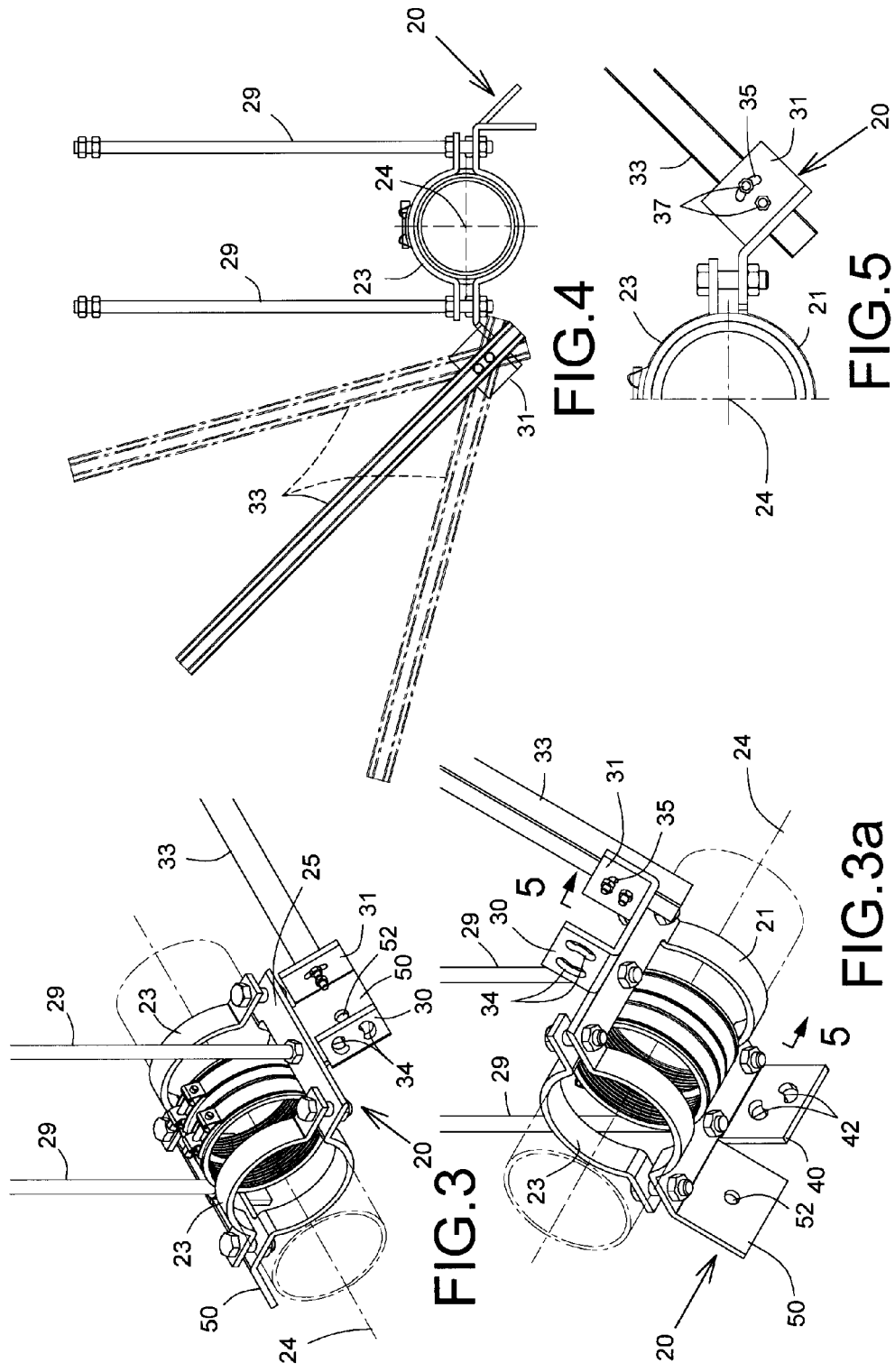

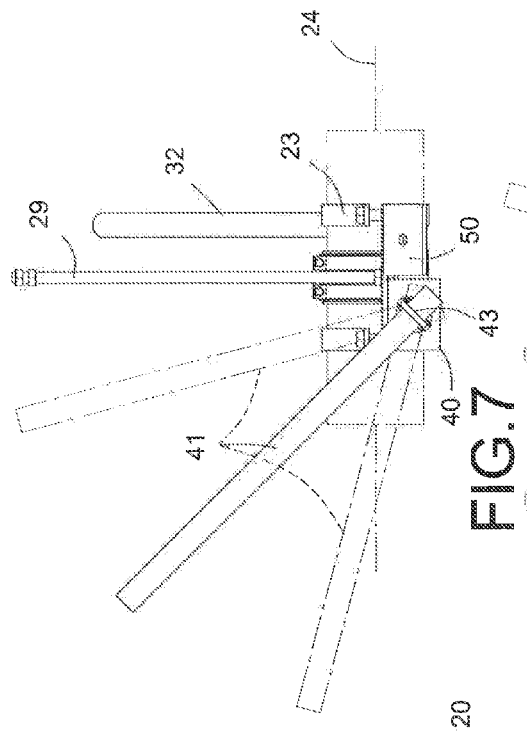
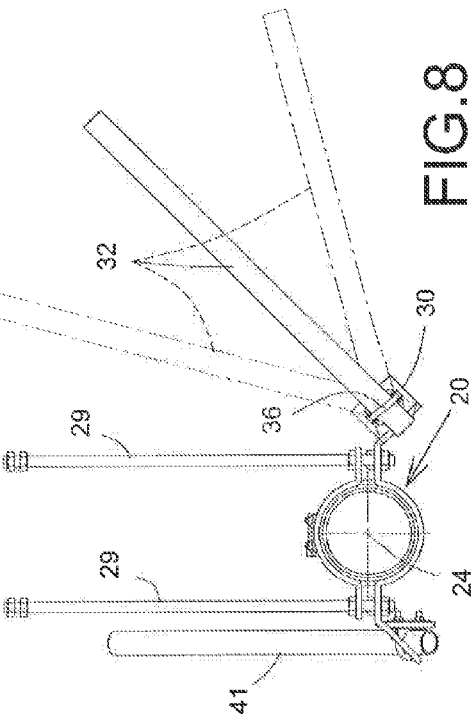
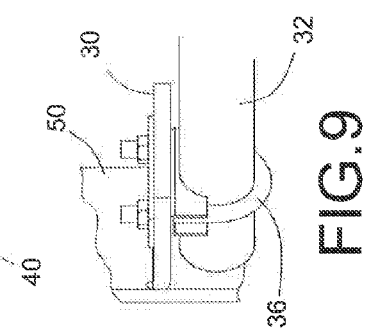

PARA-SEISMIC SUPPORT FOR PIPES

CROSS-REFERENCE TO RELATED APPLICATIONS

This application claims the benefits of U.S. provisional patent application No. 61/457,019 filed on Dec. 9, 2010, which is herein incorporated by reference.

TECHNICAL FIELD

The present disclosure relates to a para-seismic support for pipes, and more particularly to such pipes used for plumbing purposes and the mechanical joints thereof.

BACKGROUND

It is well known in the art to provide supports for pipes. Such supports usually include a support member on each side of a mechanical joint joining two pipes. The support member is then linked to a permanent structure, such as the ceiling, in order to provide adequate support for the pipes.

However, some supports, as the one described in U.S. Pat. No. 7,090,173 granted to Lussier, do provide protection against seismic tremors, or any lateral shock applied to the pipes, which could result in failure of the mechanical joint. Unfortunately, these support are limited for attachment to threaded rods or the like that are not always available and/or cumbersome to install.

Accordingly, there is a need for an improved para-seismic support for pipes that can be used with a variety of attachments.

SUMMARY

The present disclosure provides a para-seismic support for a pipe, comprising:
- a support member configured to receive the pipe, the support member having means of supporting the para-seismic support from a ceiling structure; and
- at least one axial side plate extending in a generally vertical plane perpendicular to the axis of the pipe when resting on the support member, the side plate having a pair of attachment holes extending therethrough configured for attaching to a support element.

The present disclosure further provides a para-seismic support as above, wherein the means of supporting the para-seismic support is composed of a plurality of holes to secure thereon one or more vertical support lines.

The present disclosure also provides a para-seismic support wherein the attachment holes consist of two holes, at least one of the holes being an arcuate slot to adapt to a varying position angle of the support element relative to the vertical direction, for example an angle varying between about 15° and 75°.

BRIEF DESCRIPTION OF THE FIGURES

Embodiments of the disclosure will be described by way of examples only with reference to the accompanying drawings, in which similar references used in different figures denote similar components, wherein:

FIGS. 1 and 1*a* are front top right and left perspective views of a para-seismic support for pipes in accordance with an illustrative embodiment of the present disclosure;

FIG. 1*b* is a left perspective view of an alternative embodiment of the para-seismic support of FIGS. 1 and 1*a*;

FIG. 2 is a front elevation view of the para-seismic support of FIG. 1, showing typical angles of the different side plates and hole slot angles;

FIGS. 3 and 3*a* are rear top left and rear bottom left perspective views of the para-seismic support of FIG. 1, showing the mechanical joint of the pipes (shown in stippled lines) supported thereby, and secured with two vertical lines and one U-beam member attached to a transversal side plate thereof;

FIG. 4 is a front elevation view of the para-seismic support of FIG. 3, showing possible varying angles of the U-beam member, with the pipe in solid lines;

FIG. 5 is a broken enlarged rear elevation view of the para-seismic support of FIG. 3, taken along line 5-5 of FIG. 3*a*, showing the attachment of the U-beam member to the transversal side plate, with the pipe in solid lines;

FIG. 6 is a front top right perspective view of the para-seismic support of FIG. 1, showing the mechanical joint of the pipes (shown in stippled lines) supported thereby, and secured with two vertical lines and two tubular truss members attached to a transversal side plate and an axial side plate thereof;

FIG. 7 is a right side elevation view of the para-seismic support of FIG. 6, showing possible varying angles of the tubular truss member attached to the axial side plate, with the pipe in solid lines;

FIG. 8 is a rear elevation view of the para-seismic support of FIG. 6, showing possible varying angles of the tubular truss member attached to the transversal side plate, with the pipe in solid lines;

FIG. 9 is a broken enlarged top plan view of the para-seismic support of FIG. 6, showing the attachment of the tubular truss member to the transversal side plate;

DETAILED DESCRIPTION

Figure 12:
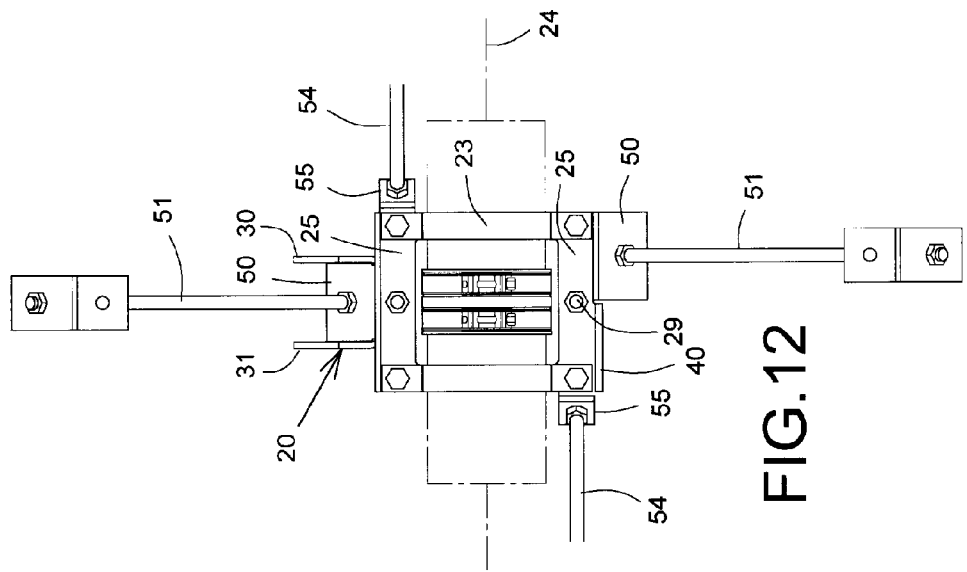
FIG. 12 is a top plan view of the para-seismic support of FIG. 10.

Generally stated, non-limitative illustrative embodiments of the present disclosure provide a para-seismic support for pipes, such as plumping pipes.

Referring to FIGS. 1 to 3, there is shown a para-seismic support 20 according to an illustrative embodiment of the present disclosure. The para-seismic support 20 comprises two support members 21 in the shape of a half-circle in order to receive a pipe, joined together through longitudinal horizontal flanges 25. It is to be understood that in an alternative embodiment the two support members 21 may be joined as a single unitary support member. The flanges 25 are provided with a plurality of holes 27 to secure thereon one or more vertical support lines 29 (see FIG. 3) using, for example, washers and nuts, for supporting the para-seismic support 20. Optionally, one or more upper generally half-circular clamps 23 (see FIGS. 3 and 3*a*) adapted to be secured to the plurality of holes 27 may be provided in order to improve attachment of the pipe to the para-seismic support 20.

It is to be understood that the supporting means composed of the combination of holes 27 and vertical support lines 29 may be replaced with other means of supporting the para-seismic support 20 from a ceiling structure.

With further references to FIGS. 4 to 9, the para-seismic support 20 further comprises at least one transversal side plate 30, 31 extending in a generally vertical plane perpendicular to the pipe axis 24 for attaching to a support element such as, for example, a tubular truss member 32 or the like and/or a U-beam member 33 (also commonly referred to as a 'can truss') or the like; the transversal side plate 30, 31 having a pair of attachment holes 34, 35 extending therethrough for securing respectively the tubular truss member 32 and/or the U-beam member 33, hanging from the ceiling structure, thereto. The attachment holes 34, 35 are configured for receiving either a U-clamp 36 or the like or fastening bolts 37, with at least one hole of the pair 34, 35 (both holes for U-clamp) being an arcuate slot to adapt to a varying position angle of the tubular truss member 32 and/or the U-beam member 33 relative to the vertical direction, typically between 15° and 75°.

It is to be understood that either or both of transversal side plates 30, 31 may be present. In an alternative embodiment shown in FIG. 1b, the para-seismic support 20' may instead be provided with a single transversal side plate 60 having two pairs of attachment holes extending therethrough for securing either the tubular truss member 32 or the U-beam member 33.

The para-seismic support 20 may further comprise an optional axial side plate 40 extending in a generally vertical plane parallel to the pipe axis 24 for attaching to a tubular truss member 41 or the like; the axial side plate 40 having a pair of attachment holes 42 extending therethrough for receiving a U-clamp 43 or the like for securing the tubular truss member 41 (see FIG. 6), hanging from the ceiling structure, thereto. At least one of the holes 42 is an arcuate slot to adapt to a varying position angle of the tubular truss member 41 relative to the vertical direction, typically between 15° and 75°. It is to be understood that in alternative embodiments the optional axial side plate 40 may be provided with various configurations of attachment holes.

Figure 10:
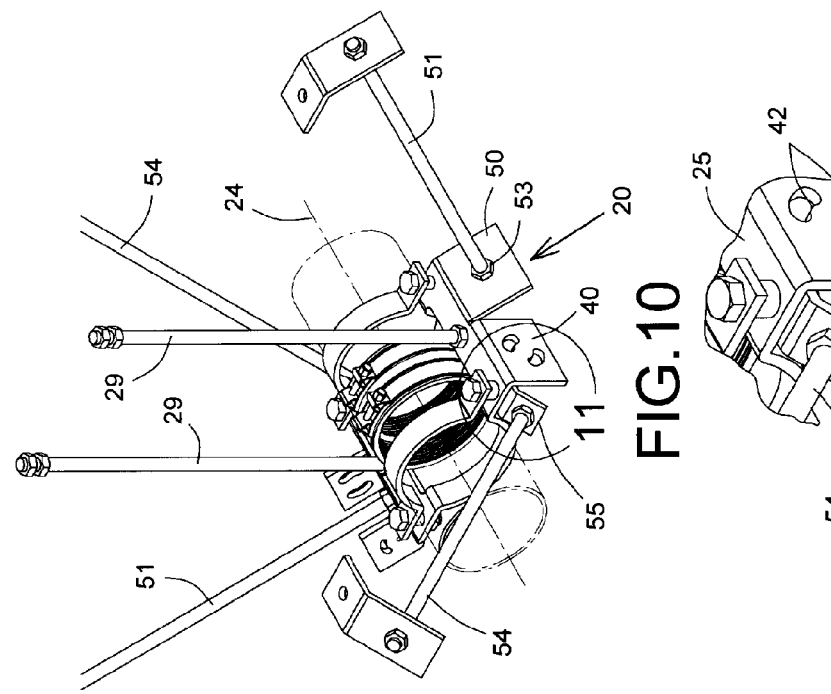
FIG. 10 is a front top right perspective view of the para-seismic support of FIG. 1, showing the mechanical joint of the pipes (shown in stippled lines) supported thereby, and secured with two vertical lines, two transversal threaded rod members attached to respective axial angled side plates thereof, and two axial threaded rod members attached to respective angled brackets secured to horizontal flanges of the para-seismic support.
Figure 11:
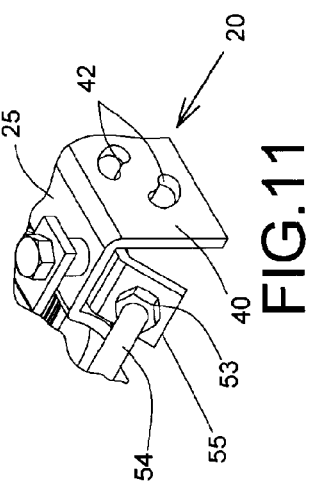
FIG. 11 is a broken enlarged front top right perspective view of the para-seismic support of FIG. 10, taken along line 11 of FIG. 10, showing the attachment of an axial threaded rod member attached to the corresponding angled bracket secured to horizontal flange of the para-seismic support.

Referring now to FIGS. 10 to 12, the para-seismic support 20 may also comprise an optional axial angled side plate 50 extending in a predetermined angular plane parallel to the pipe axis 24 for attaching to a threaded rod member 51 or the like; the axial angled side plate 50 having an attachment hole 52 extending therethrough for securing the threaded rod member 51, hanging from the ceiling structure, thereto, using, for example, washers and nuts 53. Optionally still, one or more axial threaded rod members 54 may be attached to respective angled brackets 55 secured to horizontal flanges 25 of the para-seismic support 20, via nuts 53 or the like.

Although the axial angled side plates 50 could extend at any angle from the vertical direction, it advantageously extends at about 45° in order to secure to a threaded rod 51 hanging from the ceiling also at about 45°.

Typically, the para-seismic support 20 is formed from a single piece of material, such as a folded pre-cut metallic plate or the like, as preferred in most para-seismic related building codes.

It will be understood that the lines and threaded rods 29, 51 can be wires, cords, twisted wires, chains, etc., depending on the requirements of a particular installation, and that any such means will meet the objects of the disclosure.

It will be recognized by a person skilled in the art that the para-seismic support 20 can be manufactured in different sizes and/or shapes, to accommodate different sized and shaped pipes, and from different materials. Furthermore, the length of the para-seismic support 20 is preferably adapted to avoid any interference with the mechanical joint joining two pipes.

Although the present disclosure has been described with a certain degree of particularity and by way of illustrative embodiments and examples thereof, it is to be understood that the present disclosure is not limited to the features of the embodiments described and illustrated herein, but includes all variations and modifications within the scope and spirit of the disclosure as hereinafter claimed. For example, although the para-seismic support has been shown with different quantities of different types of support members, some environments may require more support members on either side of the mechanical joint of the pipes, such as for a sturdier construction. Furthermore, although the embodiment has been shown with substantially different angled support members, other angles may also be used, if the circumstances so warrant, as to include all variations and modifications within the scope and spirit of the disclosure as hereinabove described.

I claim:

1. A para-seismic support for a pipe, comprising:
   a support member configured to receive the pipe, the support member having means of supporting the para-seismic support from a ceiling structure composed of a plurality of holes to secure thereon one or more vertical support lines; and
   at least one axial side plate extending in a generally vertical plane perpendicular to the axis of the pipe when resting on the support member, the side plate having a pair of attachment holes extending therethrough configured for attaching to a support element, at least one of the attachment holes being an arcuate slot to adapt to a varying position angle of the support element relative to the vertical direction.

2. A para-seismic support in accordance with claim 1, wherein the support member comprises two parts in the shape of a half-circle joined together through longitudinal horizontal flanges, the plurality of holes being positioned on the longitudinal horizontal flanges.

3. A para-seismic support in accordance with claim 1, wherein both said attachment holes consist of arcuate slots to adapt to a varying position angle of the support element relative to the vertical direction.

4. A para-seismic support in accordance with claim , wherein the angle is between 15° and 75°.

5. A para-seismic support in accordance with claim 1, wherein the support element is selected from a group consisting of a tubular truss member and a U-beam member.

6. A para-seismic support in accordance with claim 1, further comprising an axial side plate extending in a generally vertical plane parallel to the axis of the pipe when resting on the support member, the side plate having a pair of attachment holes extending therethrough configured for attaching to a support element.

7. A para-seismic support in accordance with claim 1, further comprising an axial angled side plate extending in a predetermined angular plane parallel to the axis of the pipe when resting on the support member, the side plate having a pair of attachment holes extending therethrough configured for attaching to a support element.

8. A para-seismic support in accordance with claim 7, wherein the predetermined angular plane is at an angle of 45°.

9. A para-seismic support in accordance with claim 1, further comprising one or more upper clamps adapted to be secured to the plurality of holes in order to improve attachment of the pipe to the support member.

10. A para-seismic support in accordance with claim 1, wherein the support member and the at least one axial side plate are formed from a single piece of material.

11. A para-seismic support in accordance with claim 1, wherein the support member and the at least one axial side plate are formed from a single piece of folded pre-cut metallic plate.

* * * * *